UNITED STATES PATENT OFFICE.

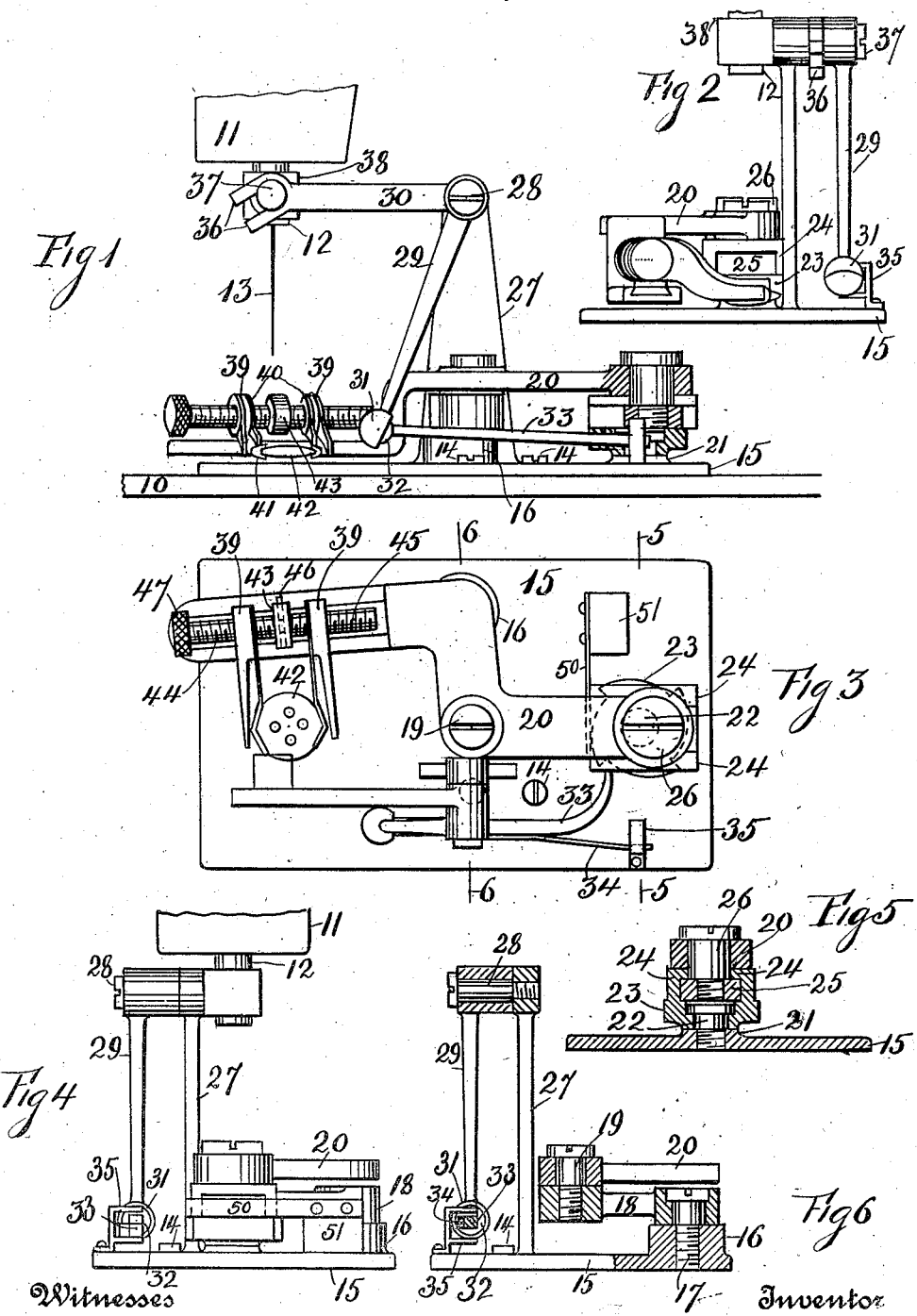

CHARLES E. ONGLEY, OF NEW YORK, N. Y., ASSIGNOR, BY MESNE ASSIGNMENTS, TO BUTTON SEWING ATTACHMENT COMPANY, A CORPORATION OF MAINE.

BUTTON-SEWING ATTACHMENT FOR SEWING-MACHINES.

No. 842,157.  Specification of Letters Patent.  Patented Jan. 22, 1907.

Application filed January 30, 1906. Serial No. 298,615.

*To all whom it may concern:*

Be it known that I, CHARLES E. ONGLEY, a citizen of the United States, and a resident of the borough of Manhattan, in the county of New York and State of New York, have invented certain new and useful Improvements in Button-Sewing Attachments for Sewing-Machines, of which the following is a specification.

This invention relates to a button-sewing attachment for sewing-machines. Its object is to provide a device of this character adapted to be easily and readily attached to or removed from a sewing-machine.

In the drawings, Figure 1 is a side view, partly in section, of a device embodying the invention attached to a sewing-machine. Fig. 2 is a partial left-hand end view of Fig. 1. Fig. 3 is a plan view of the device shown in Fig. 1. Fig. 4 represents a right-hand end view of Fig. 1. Fig. 5 shows a section of Fig. 3 on the line 5 5. Fig. 6 is an end view and partial section of Fig. 3 on the line 6 6.

The bed-plate of a sewing-machine is shown at 10, with the arm of the machine at 11, needle-bar 12, and needle 13. On the bed-plate 10 is fastened with screws 14 the bottom plate 15 of the device. A boss 16 extends up from the plate 15 and has secured thereto the journal-pin 17, on which latter is journaled the link 18. The link 18 carries the pin 19, to which is fulcrumed the arm 20. From the plate 15 extends the boss 21, into which is screwed the journal-pin 22, and on the latter is journaled a ratchet-wheel 23, which carries the guides 24 for an adjustable nut 25. Into the nut is screwed the journal-pin 26, which carries one end of the arm 20.

A spring 50 is fastened to a lug 51, extending from the bottom plate, and bears against one end of the guides 24. A lug 27 extends up from the plate 15 and carries a pin 28, on which is journaled a bell-crank with the arms 29 and 30. The end of the arm 29 carries the hollow sphere 31, which, with the ball 32, constitutes a ball-and-socket joint. To the ball 31 is attached the pawl 33, the end of which engages with the ratchet-wheel 23. On the front side of the pawl 33 is fastened the spring 34, which bears against the guide 35. The arm 30 of the bell-crank has the forked end 36, which is supported on a pin 37, which pin also supports a sleeve 38 in position on the needle-bar 12.

The swinging arm 20 is dovetailed for the adjustable jaws 39, that carry supporting-springs 40, in which are formed pockets 41 for supporting a button 42. A stationary support 43 extends from the arm 20. A screw with right-hand threads 44 and left-hand threads 45 is supported and arranged to rotate in the support 43, a pin 46 engaging with a groove turned in the body of the screw at about its middle portion. The jaws 39 are threaded to receive the threads of the screw and a removable cap 47 is fastened to the screw, as shown.

To operate the invention, the jaws 39 are set at the proper distance apart, so that the button to be operated upon will be properly clamped by the pockets 41 of the springs 40, and the pin 26 is made to clamp the nut 25 in the guides 24 to obtain the requisite distance of the axis of the pin 26 from the axis of the ratchet-wheel 21 to give the proper throw to the arm 20. When the sewing-machine is started, the needle-bar will cause the oscillation of the bell-crank with the arms 29 and 30. The pawl 33 will intermittently rotate the ratchet-wheel 23, which will move the right-hand end of the arm in a circular path, which motion will also be obtained for the button 42, thereby placing it at the proper times under the needle, so that the latter, with its thread, can enter and pass through the openings in the same.

The spring 34 maintains the pawl 33 in engagement with the ratchet-wheel 23, and the spring 50 maintains the ratchet-wheel in proper position when the pawl is traveling upon the same.

Having described my invention, I claim—

1. In a button-sewing attachment for a sewing-machine the combination of a plate, a link journaled on the plate, a ratchet-wheel journaled on the plate, a pin adjustably connected with the ratchet-wheel, a swinging arm fulcrumed to the said link, one end of the arm journaled to the pin connected with the ratchet-wheel, adjustable jaws connected to the other end of the arm, and means to turn the ratchet-wheel.

2. In a button-sewing attachment for sewing-machines the combination of a plate, means to fasten the plate in position on the sewing-machine, a link journaled on the plate, a ratchet-wheel journaled to the plate, a pin adjustably connected with the ratchet-wheel, a swinging arm fulcrumed to said link, one end of the arm journaled on the pin extending from the ratchet-wheel, adjustable jaws extending from the other end of the arm, a lug extending from the plate, a bell-crank journaled from the upper end of the lug, one arm of the bell-crank connected with the needle-bar, the other end of the bell-crank carrying a pawl and the pawl arranged to engage with the ratchet-wheel.

3. In a button-sewing attachment for a sewing-machine the combination of a bottom plate attached to the bed of the machine, a link journaled to the bottom plate, a swinging arm fulcrumed to the said link, a ratchet-wheel journaled to the bottom plate, guides extending from the ratchet-wheel, a nut located in the said guide, a pin secured into the nut to clamp the nut in different positions in the guides, one end of the swinging arm journaled on the pin extending from the said nut, jaws arranged to be adjustably held on the other end of the arm, a support extending from the arm between the latter jaws, a screw with a right-handed and a left-handed thread held in said support, the screw engaging threads in the adjustable jaws on the arm, spring-jaws connected with the said adjustable jaws to hold a button, a lug extending up from the bottom plate, a bell-crank journaled to the latter lug, an arm of the bell-crank having a forked end connected with the needle-bar of the machine, the second arm having a pawl connected therewith, a ball-and-socket joint connecting the arm of the bell-crank and pawl, a spring attached to the pawl, and a guide for the spring, to maintain the pawl in engagement with the ratchet-wheel.

Signed at New York, in the county of New York and State of New York, this 27th day of January, A. D. 1906.

CHARLES E. ONGLEY.

Witnesses:
MYRON H. COOK,
A. A. DE BONNEVILLE